(12) United States Patent
Kojima

(10) Patent No.: US 6,632,066 B1
(45) Date of Patent: Oct. 14, 2003

(54) CARRYING AND LOADING/UNLOADING APPARATUS

(75) Inventor: Kunio Kojima, Noda (JP)

(73) Assignee: Koshiji Kinzoku Co., Ltd., Ibaraki (JP)

( * ) Notice: Subject to any disclaimer, the term of this patent is extended or adjusted under 35 U.S.C. 154(b) by 0 days.

(21) Appl. No.: 09/653,137

(22) Filed: Aug. 31, 2000

(30) Foreign Application Priority Data

Sep. 6, 1999 (JP) ............................................. 11-251215
Aug. 4, 2000 (JP) ........................................ 2000-236682

(51) Int. Cl.⁷ .................................................. B60P 1/00

(52) U.S. Cl. ...................... 414/510; 414/521; 414/525.1

(58) Field of Search ................................. 414/509, 510, 414/511, 517, 521, 525.1; 198/721

(56) References Cited

U.S. PATENT DOCUMENTS

| | | | | |
|---|---|---|---|---|
| 3,465,902 A | * | 9/1969 | Colletti | |
| 4,015,727 A | * | 4/1977 | Rezac | |
| 4,113,122 A | * | 9/1978 | Lutz | |
| 5,009,564 A | * | 4/1991 | Lutz et al. | 414/510 |
| 5,143,508 A | * | 9/1992 | Lutz et al. | 414/510 |

* cited by examiner

Primary Examiner—James W. Keenan
(74) Attorney, Agent, or Firm—Koda & Androlia

(57) ABSTRACT

A carrying and loading/unloading apparatus including a slide plate adapted to reciprocally move on a bottom plate such as that of a truck bed, a partition plate provided on the slide plate and the partition plate side ends securable to right and left bed side plates of the truck so that only the slide plate is moved when the partition plate is secured to the bed side plates as the slide plate moves forward and so that the partition plate moves together with the slide plate when the partition plate is released from the bed side plates as the slide plates moves rearward.

2 Claims, 23 Drawing Sheets

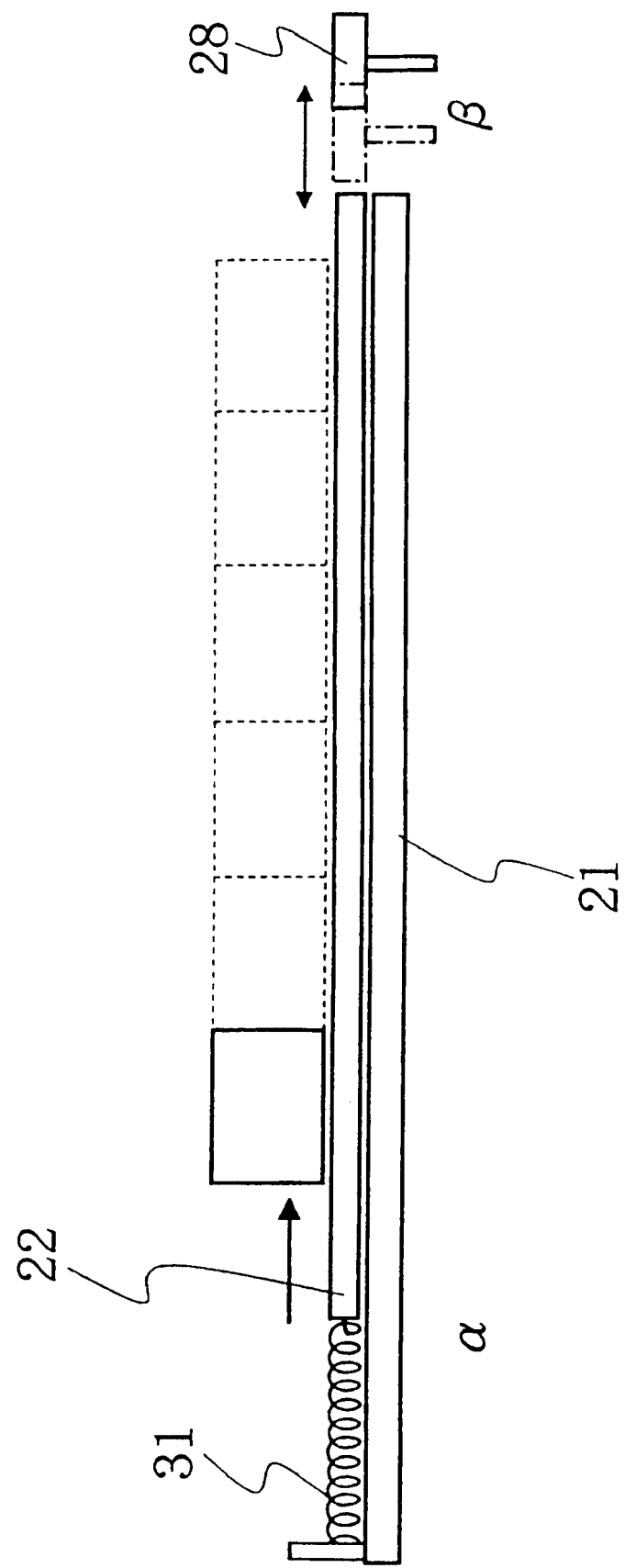

Fig.30A
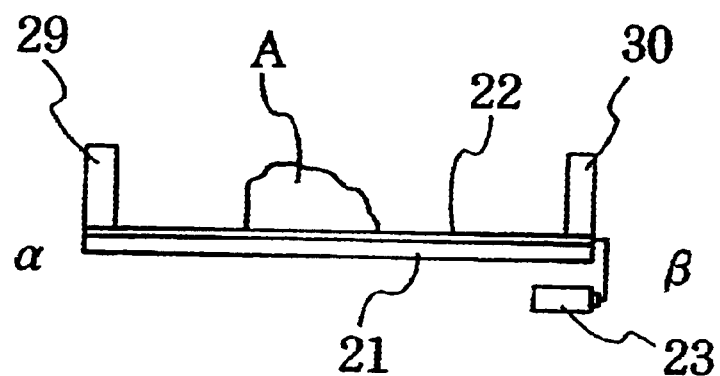
Fig.30B
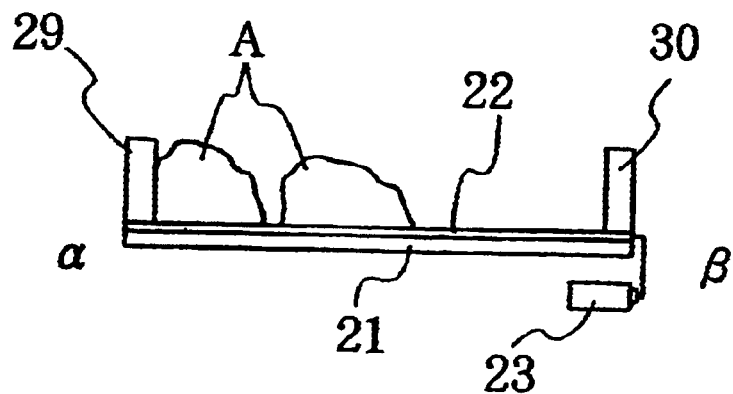

CARRYING AND LOADING/UNLOADING APPARATUS

BACKGROUND OF THE INVENTION

1. Field of the Invention

The present invention relates to a carrying and loading/unloading apparatus capable of continuously transferring a load, which apparatus can be mainly utilized as an unloading apparatus and/or a loading apparatus such as on a truck bed, and can be otherwise utilized instead of a belt conveyor or a crane, for example.

2. Related Art

There will be firstly mentioned an unloading apparatus on a truck bed, as a representative example of a loading/unloading apparatus. Methods for unloading loads in a state of chips from a conventional truck bed includes: a so-called dumping method for tiltingly ascending and descending a bed 1 itself by a cylinder 2 as shown in FIG. 32; and a method for providing a feed plate 4 on a bed 1 such that the feed plate 4 is moved backwardly by a cylinder 3 to thereby push out chips on the bed 1 by the feed plate 4 as shown in FIG. 33.

There is a further loading/unloading apparatus constituted of a platform 5, a hydraulic mechanism 6, a cylinder 7, an over van 8 and a weighing equipment 9, as shown in FIG. 34. The platform 5 is adapted to tilt the chip vehicle by 55 degrees at the maximum by driving the hydraulic mechanism 6 and cylinder 7. This platform 5 is framed of shaped steels and steel plates so as to have sufficient wideness and strength for unloading the chip vehicle, and is attached with, at one end of this platform 5, a backstop 10 as a car stop adopting a strong shaped steel for supporting the chip vehicle upon tilting the platform 5.

Among the conventional methods shown in FIGS. 32 through 34, it is required for the dumping method of the bed 1 shown in FIG. 32 to exhibit a tilt angle greater than a predetermined value so as to smoothly and fully discharge the whole of chips on the bed 1. However, the cylinder 2 has a limitation, and tilting the bed 1 shifts its center of gravity thereby leading to an unstable state.

In case of the feed plate method shown in FIG. 33, the feed plate 4 is required to be moved from one extremity to the other extremity of the bed 1, resulting in a problem of the stroke of the cylinder 3 and in necessity of a specific multi-stage cylinder. Further, the longer length of the bed 1 may lead to failure of feeding. Namely, there may be such a situation that the rear extremity of the loads becomes somehow immovable or clogged, to thereby cause a pressure to overflow the loads just in front of the feed plate and/or to bulge out the side plates of the bed 1. Moreover, although it is not impossible to successively move the cylinder 3 itself, the fixing procedure therefor will be then complicated and the maneuverability thereof is also troublesome.

Still more, since the feed plate 4 is to have a force for backwardly pushing the chips, the cylinder 3 is required to have a strong driving force.

Further, in the method shown in FIG. 34 for tilting the whole of the chip vehicle by the platform 5, the whole of the apparatus becomes large scaled whereas the unloading task is performed only at the place where the platform 5 is provided. In addition, entrance of a next chip vehicle while the over van 8 is left open during a series of tasks may result in that the next chip vehicle falls into a receiving bin. Similarly, insufficiently or inappropriately elevated positions of the backstop 10 also result in the fall of the vehicle, causing a serious accident.

SUMMARY OF THE INVENTION

The present invention has been carried out in view of the conventional problems as described above, and it is therefore an object of the present invention to provide a carrying and loading/unloading apparatus which: dissolves the disadvantage of the conventional examples; is constituted in a simple manner without requiring a complicated and large scaled apparatus; can be inexpensively fabricated; and allows an effective loading/unloading task with a fewer workers in a sufficiently safe manner.

Firstly, to carry out the aforementioned object, the present invention essentially provides a carrying and loading/unloading apparatus comprising: a bottom plate; a slide plate provided on the bottom plate so as to reciprocally move on the bottom plate; and a partition plate provided on the slide plate, the partition plate having securable side ends, so that only the slide plate below the partition plate is moved during securement of the side ends of the partition plate and so that the partition plate moves together with the slide plate during release of the side ends of the partition plate.

Secondly, the present invention essentially provides a carrying and loading/unloading apparatus constituting an unloading apparatus for a truck bed, comprising: a slide plate provided on a bottom plate of the truck bed so as to reciprocally move on the bottom plate from a cabin side of the truck toward the rear end of the truck; and a partition plate provided on the slide plate, the partition plate having side ends securable to right and left side plates of the truck, so that only the slide plate below the partition plate is moved during securement of the side ends of the partition plate and so that the partition plate moves together with the slide plate during release of the side ends of the partition plate.

Thirdly, the present invention essentially provides a carrying and loading/unloading apparatus comprising: a bottom plate; a slide plate provided on the bottom plate so as to reciprocally move on the bottom plate; and a partition as load movement restricting means for restricting the reciprocal movements of loads located on the slide plate and apt to be moved together with the slide plate, to one direction of the reciprocal movements such as a return path direction, wherein the partition forms a delivering portion for delivering loads onto the slide plate, so that those loads continuously delivered via the delivering portion and positioned on the slide plate are transferred only in an unrestricted advance path direction while the movement of the loads in the return path direction is restricted by the partition.

Fourthly, the present invention essentially provides a carrying and loading/unloading apparatus comprising: a slide plate adapted to be reciprocally moved; wherein the movement of the slide plate in one direction of the reciprocal movements such as in the return path direction is rendered to be rapid relative to in the advance path direction, such that the load positioned on the slide plate and apt to be moved together with the slide plate is kept at its then position when the slide plate is moved in the return path direction so rapidly, so that the load positioned on the slide plate is transferred only in the advance path direction by the difference between the speed of the slide plate in the return path direction and the speed of the slide plate in the advance path direction.

Fifthly, the present invention essentially provides a carrying and loading/unloading apparatus comprising: a slide plate adapted to be reciprocally moved; wherein successive strikes are given onto the slide plate from an advance path direction toward a return path direction, to thereby move loads on the slide plate in the advance path direction by means of an inertia effect.

Sixthly, the present invention essentially provides a carrying and loading/unloading apparatus comprising: a bottom plate; a slide plate provided on the bottom plate so as to reciprocally move on the bottom plate; and a moveable partition and a fixed partition, both provided above the slide plate, with a distance being between the moveable partition and the fixed partition; wherein the moveable partition moves synchronously with the slide plate such as in an advance path direction, whereas only the slide plate moves in one of the reciprocal movements of the slide plate such as in a return path direction; wherein the fixed partition is fixed fully irrespectively of the reciprocal movements of the slide plate, and wherein the moveable partition is sequentially advanced to a forward side position on the slide plate, so as to move the loads into the advance path direction and to further press the loads by the moveable partition and the fixed partition.

According to an embodiment of the present invention, the slide plate on the bottom plate reciprocally moves, and the partition plate moves together with the slide plate during release of the side ends of the partition plate. Further, the loads are position on the slide plate and moved together therewith. On the other hand, the loads are prevented from moving by the partition plate and only the slide plate is moved, during securement of the side ends of the partition plate.

By moving the loads and the partition plate in one direction such as the advance path direction together with the slide plate and by moving only the slide plate in the return path direction, the loads and the partition plate are sequentially moved in the advance path direction as a result of the reciprocal movements of the slide plate.

The present invention recited in this embodiment relates to a situation where the apparatus of the first embodiment is constituted as an unloading apparatus for a truck bed, and such as chips as loads are positioned on the slide plate and backwardly moved together with the slide plate, so that the rearward chips are moved outwardly from the truck bed.

Although the chips are on the slide plate at this phase, forward withdrawal of the slide plate while restricting the forward chips by engaging the partition plate with bed side plates results in omission of the slide plate portion under the rearward chips to thereby drop the chips.

There are repeated release of the engagement between the partition plate and the bed side plates, rearward movements of the chips together with the slide plate, and subsequent motions, to thereby sequentially drop the rearward portion of the chips.

Note, even when a cylinder is used for reciprocally moving the slide plate forwardly and rearwardly, it is possible to use a small cylinder having a short stroke. Further, since the partition plate is not provided for pushing out the chips, such as the strength of the partition plate itself and the engagement thereof with the bed side plates are not required to be strong.

According to an embodiment of the present invention, the slide plate is provided so as to reciprocally move on the bottom plate, and the loads are located on the slide plate and apt to be moved together with the slide plate. The partition forms the delivering portion of loads onto the slide plate, and restricts the movement of the loads to one direction such as the return path direction of the reciprocal movements in which the load are moved together with the slide plate, while allowing the movement of the loads only in the advance path direction.

In this way, loads on the slide plate are separated from the partition to thereby generate a space between the partition and the loads, and loads are newly filled into the space such that the formerly moved loads and the newly filled loads are moved together in the advance path direction. In this way, it becomes possible to keep on sequentially feeding those loads continuously delivered onto the slide plate, in the advance path direction.

Note, even when a cylinder is used for reciprocally moving the slide plate forwardly and rearwardly, it is possible to use a small cylinder having a short stroke. Further, since the partition plate is not provided for pushing out the chips, such as the strength of the partition plate itself is not required to be strong.

According to an embodiment of the present invention, the slide plate adapted to be reciprocally moved is installed on a bottom plate similarly to the invention recited in an earlier embodiment, and loads are positioned on the slide plate and apt to reciprocally move together with the slide plate. Further, the movement of the slide plate in one direction of the reciprocal movements such as in the return path direction is rendered to be rapid relative to in the advance path direction, such that the load positioned on the slide plate and apt to be moved together with the slide plate is kept at its then position under the inertia of the load. Thus, the load is transferred by the slide plate only in the advance path direction by the difference between the speeds of the reciprocal movements of the slide plate.

According to an embodiment of the present invention, strikes are given onto the slide plate from the advance path direction toward the return path direction, to thereby slightly move loads on the slide plate in the advance path direction by means of an inertia effect, and successive strikes causes a sequential movement of the loads in the advance path direction.

According to an embodiment of the present invention, the transferred loads can be pressed further.

BRIEF DESCRIPTION OF THE DRAWINGS

FIG. 28 is an explanatory side view showing a carrying and loading/unloading apparatus according to a fourth embodiment of the present invention;

FIGS. 30A and 30B are explanatory side views showing 6th and 7th steps of a carrying and loading/unloading apparatus according to the fifth embodiment of the present invention;

DETAILED DESCRIPTION OF THE PREFERRED EMBODIMENT

Figure 1:
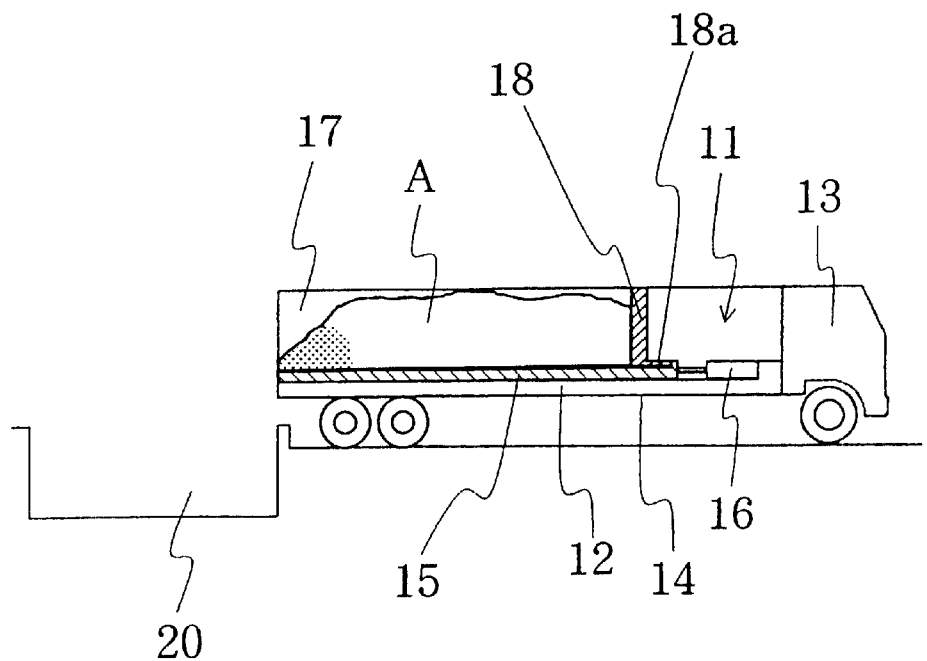
FIGS. 1 through 9 are longitudinally sectioned side views of a carrying and loading/unloading apparatus according to a first embodiment of the present invention, so as to show 1st through 9th steps where the apparatus is used as an unloading apparatus of a truck bed.

There will be described hereinafter the embodiments according the present invention, with reference to the accompanying drawings.

FIGS. 1 through 9 are longitudinally sectioned side views of a carrying and loading/unloading apparatus according to a first embodiment of the present invention, so as to show 1st through 9th steps where the apparatus is used as an unloading apparatus of a truck bed. Further, FIGS. 10 through 18 are plan views of the 1st through 9th steps of the carrying and loading/unloading apparatus. In the figures, reference numeral 11 designates a truck, 12 is a bed thereof, 13 is a cabin (driving seat). This truck 11 carries particle bodies such as scrap iron and other chips and gravel as a load A.

The bed 12 of the truck 11 is of a rear-end open type, and the present invention has provided on a bottom plate 14 of the bed 12 a slide plate 15 having a width substantially identical with that of the bottom plate 14. This slide plate 15 is fabricated of a steel plate, for example, and a cylinder 16 is provided as a forward/rearward reciprocating mechanism for the slide plate 15, between the back of the cabin 13 and the front end of the slide plate 15.

Further, there is provided a partition plate 18 on the slide plate 15. This partition plate 18 has side ends securable to or engageable with right and left bed side plates 17 of the bed 12 to thereby anchor the plate 18 to the bed 12, such that the lower end of the partition plate 18 is separated from the slide plate 15 upon engagement of the partition plate 18 to the bed side plates 17 so that only the slide plate 15 is moved, and such that the partition plate 18 is engaged with the slide plate 15 such as by friction upon release or disengagement of the partition plate 18 from the bed side plates 17 so that the partition plate 18 is moved together with the slide plate 15.

It is preferable that the partition plate 18 is fabricated such as of a steel plate so as to have a bottom base 18a having a slight width to self-support on the slide plate 15. Further, the engagement between the partition plate 18 and bed side plate 17 is exemplarily provided by stopping pins 19 in the first embodiment. However, the engagement is not limited thereto. Any means such as projecting/retracting projection or hook is possible insofar as the same is adapted to engage and disengage the partition plate 18 with and from the bed side plates 17 at arbitrary positions or at suitable intervals in the lengthwise direction of the bed side plate 17.

Figure 10:
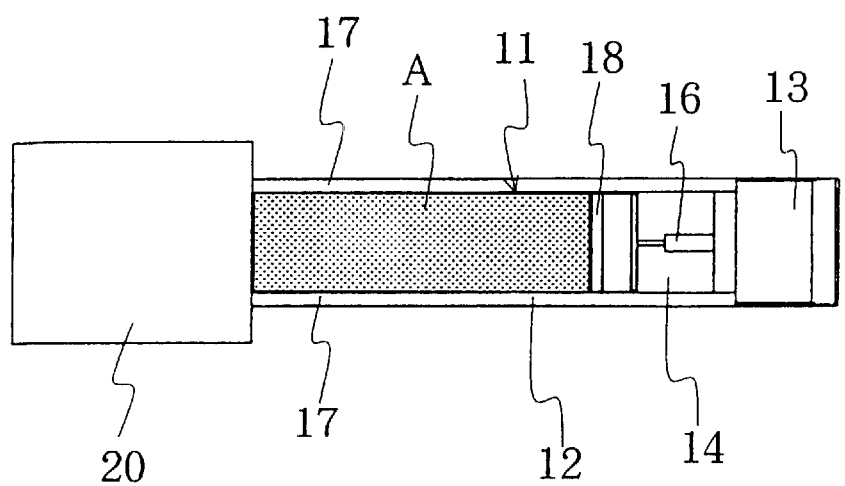
FIGS. 10 through 18 are plan views of the carrying and loading/unloading apparatus corresponding to FIGS. 1 through 9, respectively.

There will be now described a procedure for using the apparatus. Assuming that the load A is located on the bed 12 of the truck 11 as shown in FIGS. 1 and 10, the vehicle is stopped such that its rear end is registered with a pit 20, and the rear end plane of the bed 12 is opened.

Figure 2:
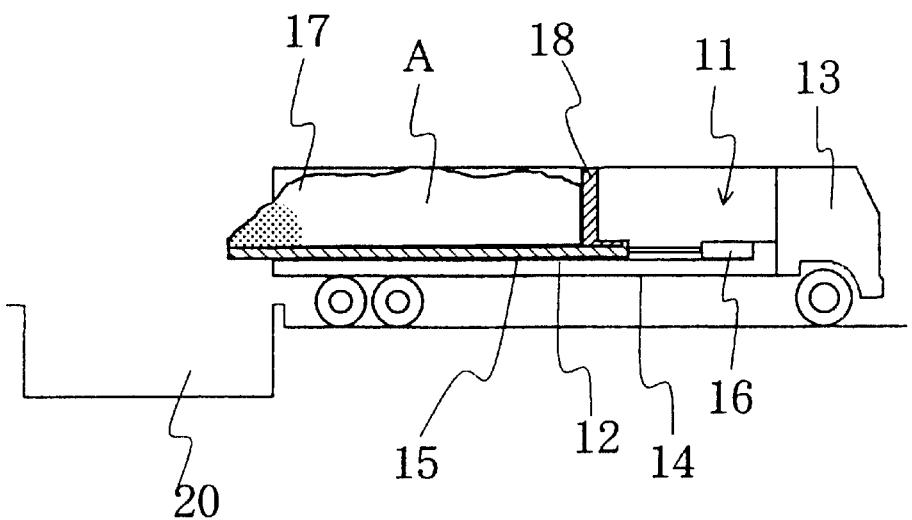
Figure 11:
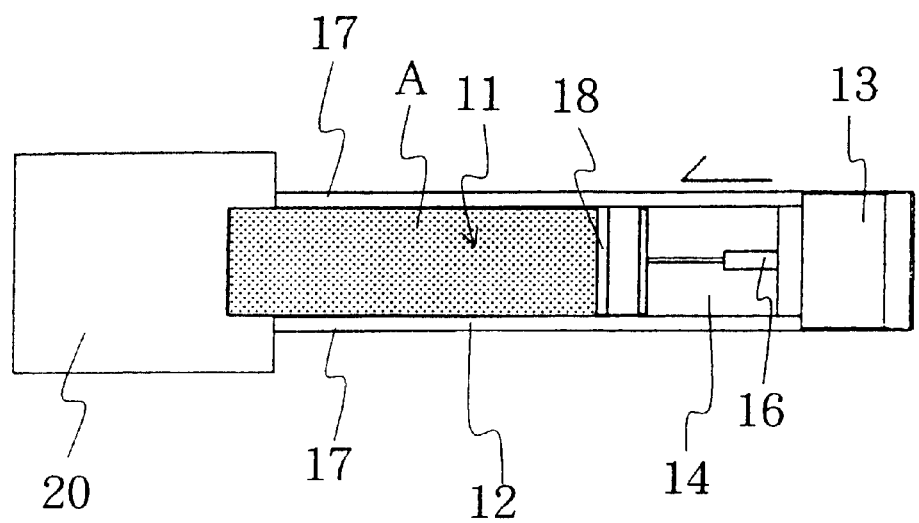

As shown in FIGS. 2 and 11, extension of the cylinder 16 causes a movement of the slide plate 15 from the cabin 13 side toward the rear end so that the load A on the slide plate 15 and the partition plate 18 are moved correspondingly thereto. It is noted that the partition plate 18 is not engaged with the bed side plate 17 in this state.

Slide of the slide plate 15 results in that the rear end of the slide plate 15 carrying the load A thereon is projected above the pit 20 rearwardly of the bed 12.

Figure 3:
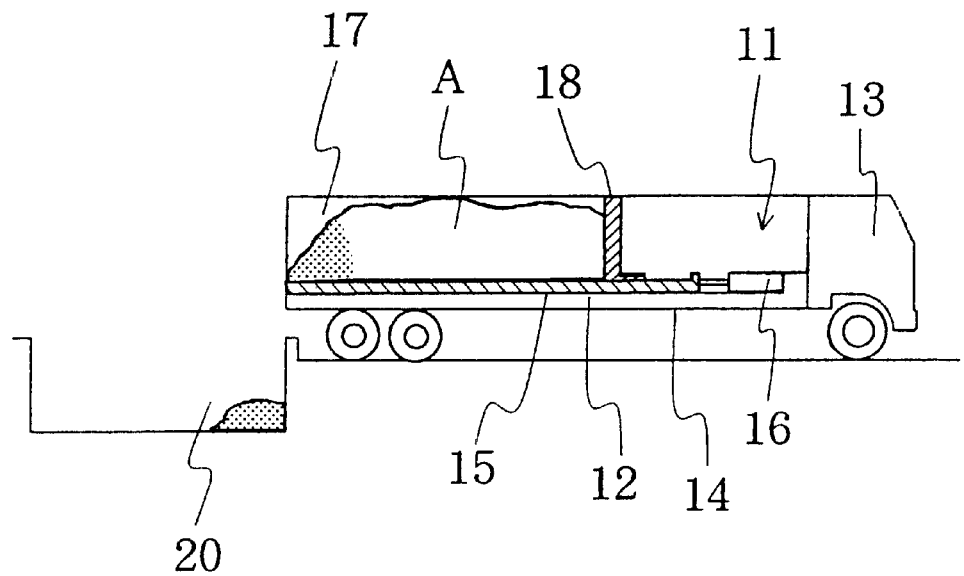
Figure 12:
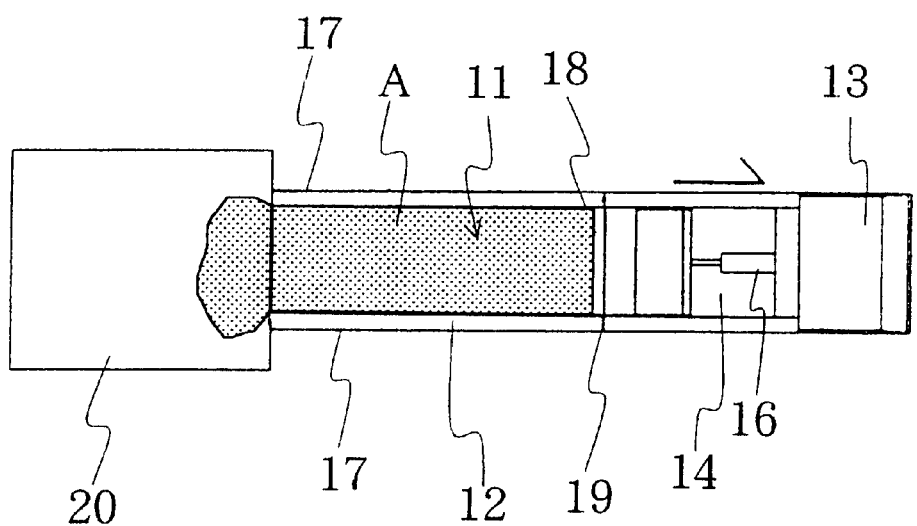

Next, as shown in FIGS. 3 and 12, when the partition plate 18 is engaged with the bed side plates 17 such as by the stopping pins 19 and the cylinder 16 is retracted to thereby pull the slide plate 15 as it is toward the cabin 13 side, the load A is immovable since the front end thereof is fixed by the partition plate 18, so that the portion of the load A projecting over the pit 20 falls into the pit 20 at a position backward of the bed 12 due to the retraction of the slide plate 15.

Figure 4:
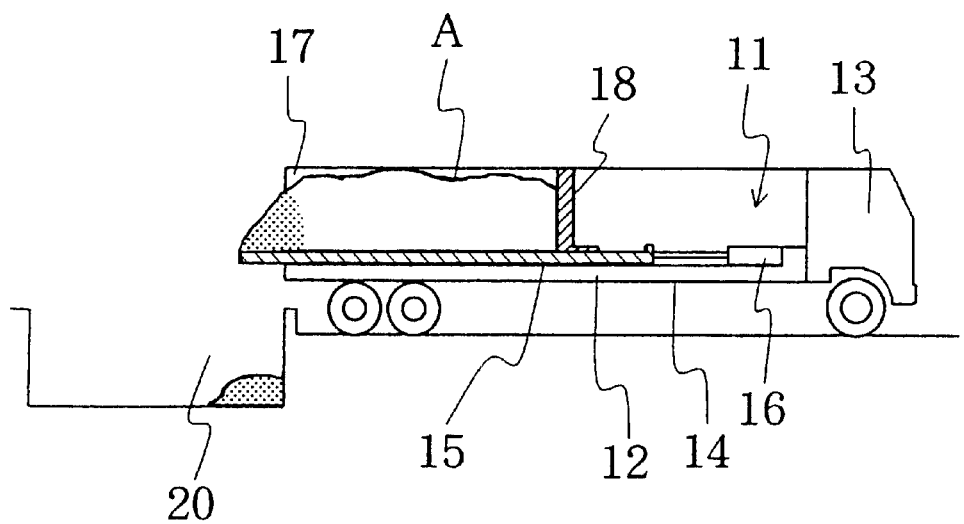
Figure 5:
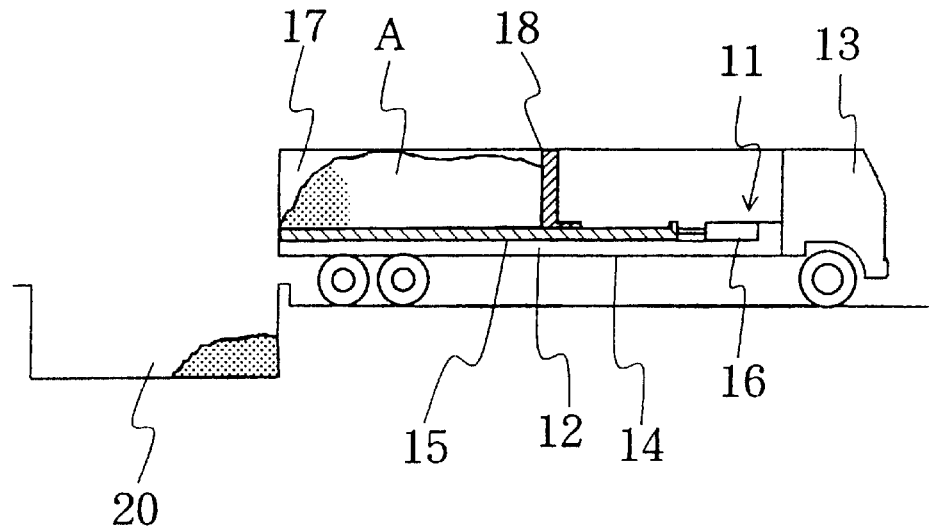
Figure 6:
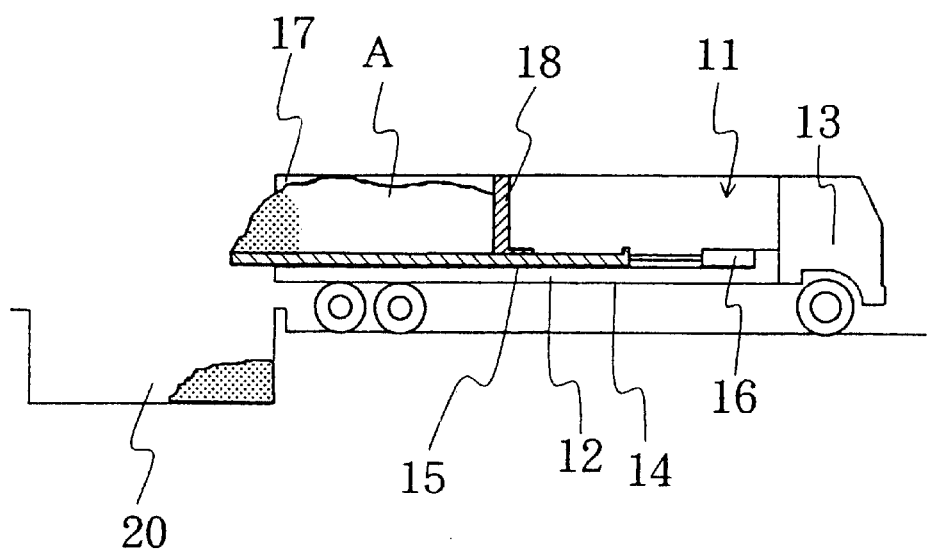
Figure 7:
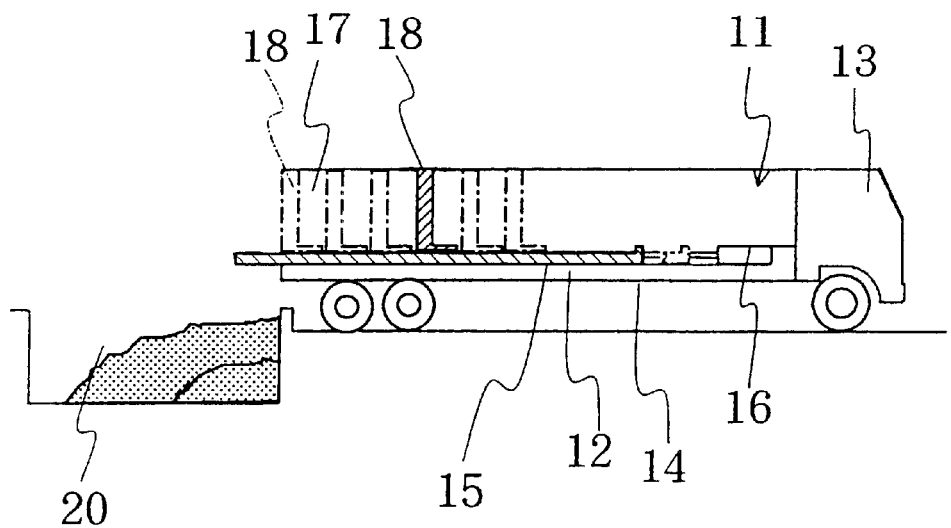
Figure 8:
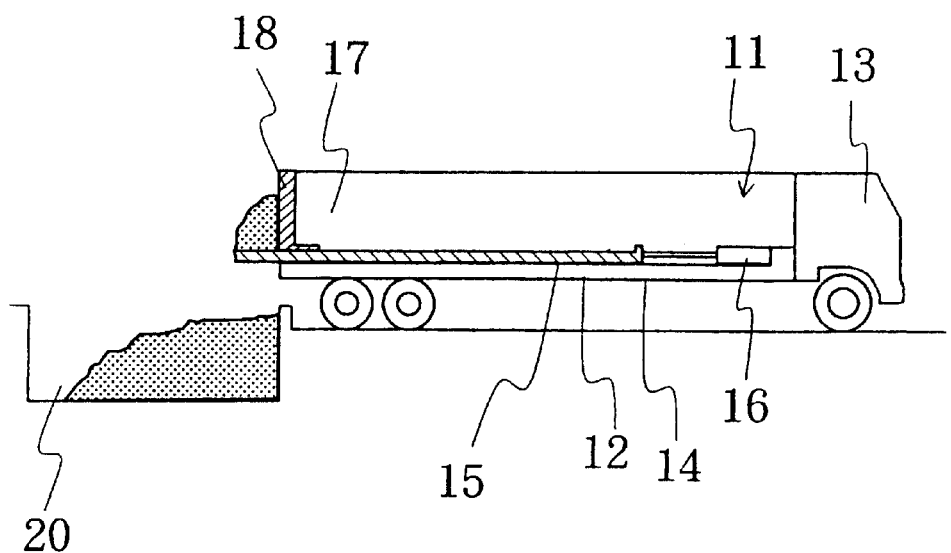
Figure 13:
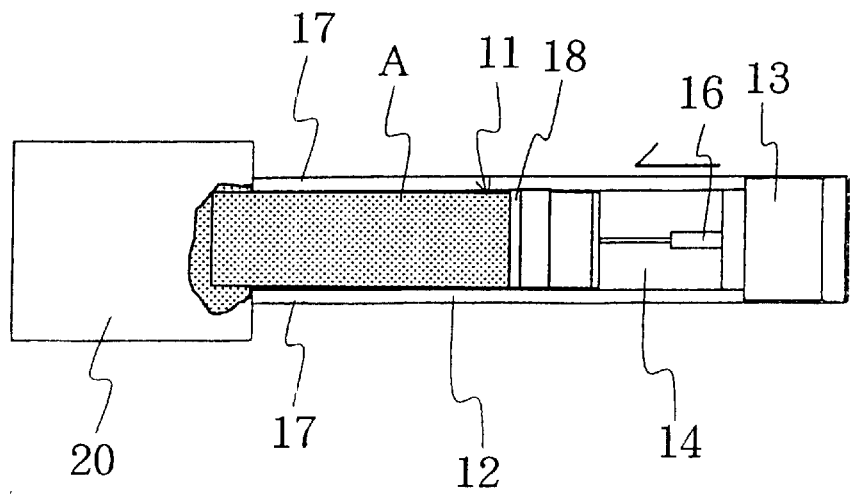
Figure 14:
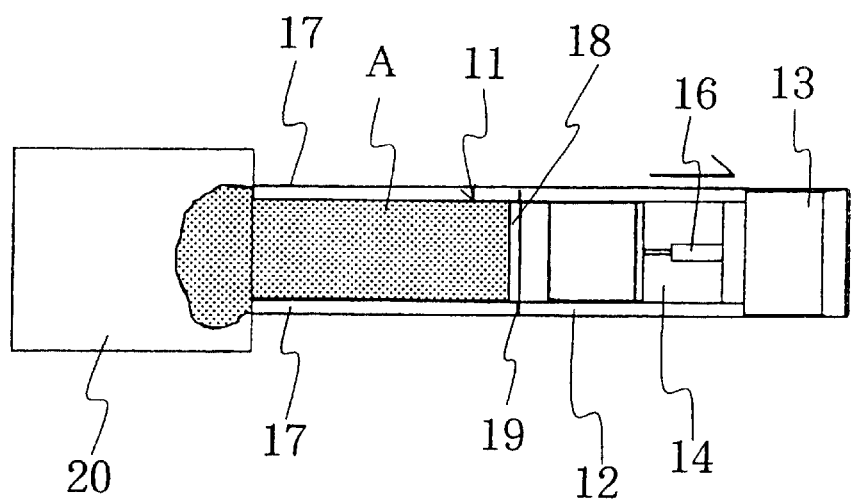
Figure 15:
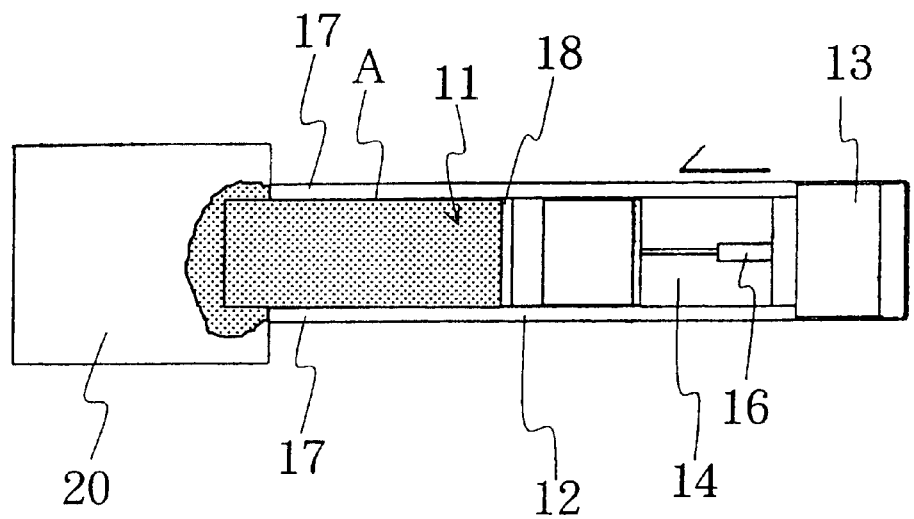
Figure 16:
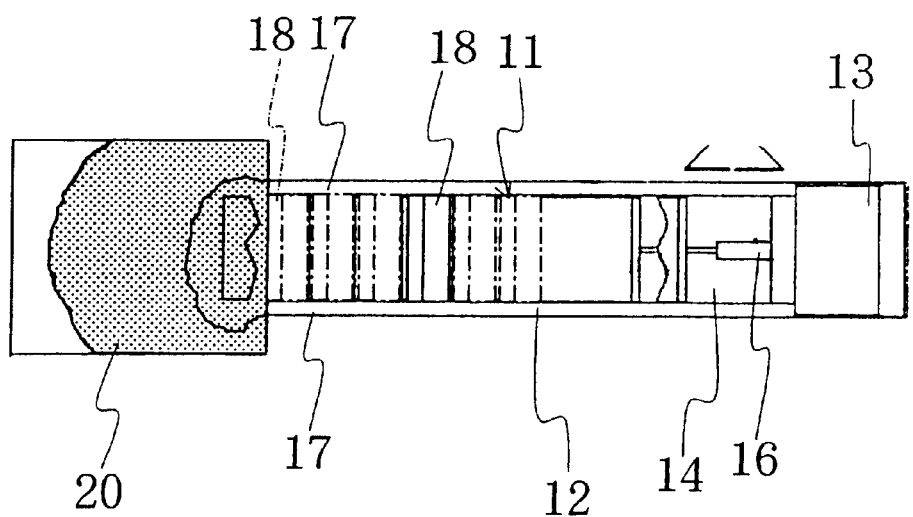
Figure 17:
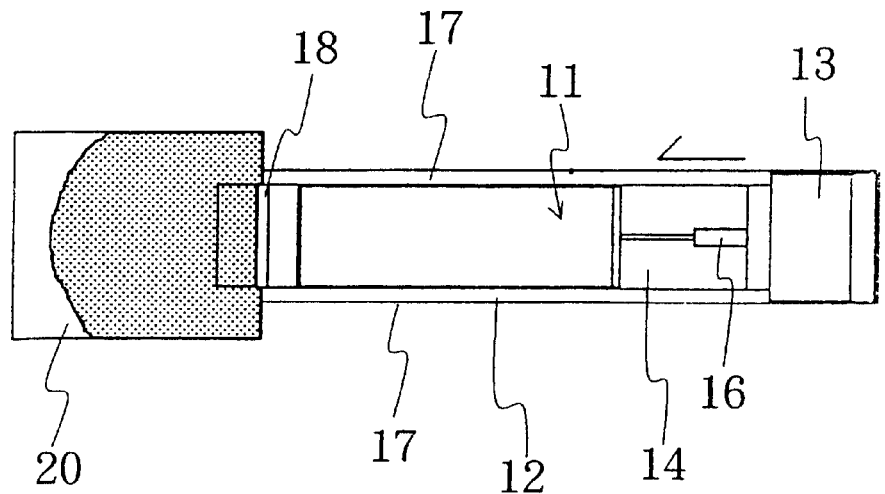

After such falling of the load A, the partition plate 18 is disengaged from the bed side plates 17 and the cylinder 16 is again extended to pull out the slide plate 15 backwardly as shown in FIGS. 4 and 13. Subsequently, there are repeated the procedures of (1) pulling out the slide plate 15, (2) engaging the partition plate 18, (3) retracting the slide plate 15, (4) dropping the load A, and (5) disengaging the partition plate 18, as shown in FIGS. 5 through 9 and FIGS. 14 through 18, to thereby fully drop the load A into the pit 20.

Figure 9:
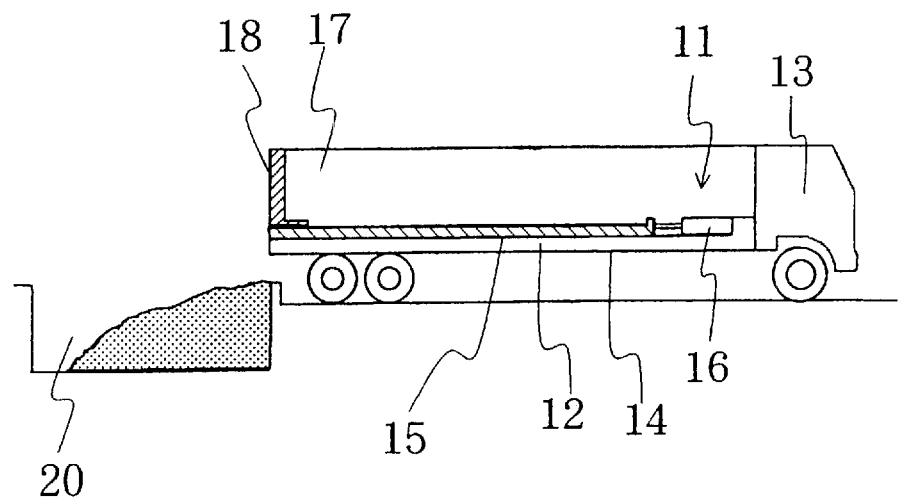
Figure 18:
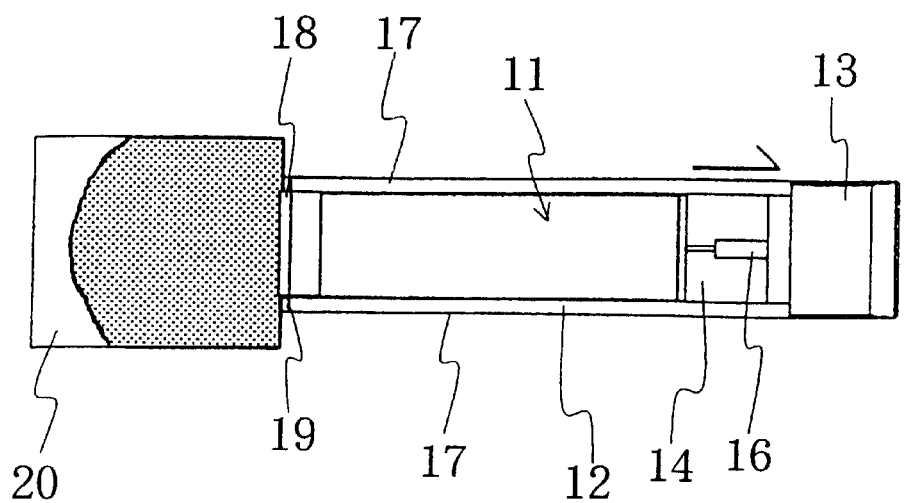

FIGS. 9 and 18 show a situation where all the load A has been unloaded. To again prepare for loading, the partition plate 18 is to be moved toward the cabin 13 side, up to the front end of the slide plate 15.

Note, this movement of the partition plate 18 toward the front end of the slide plate 15 may be performed by: sequentially moving the partition plate 18 forwardly such that the partition plate 18 is repeatedly engaged with and disengaged from the bed side plates 17 and the partition plate 18 is engaged with the bed side plates 17 only when the slide plate 15 is moved backwardly; or adopting other means such as a crane and/or other devices.

Further, the slide plate 15 has been moved forwardly and backwardly by the cylinder 16, in the aforementioned embodiment. However, as another embodiment, it is possible to adopt various driving mechanisms such as a mechanism of a pulling member like a winch and wire, and/or a combination of a pinion to be driven by a driving motor and a rack meshing therewith.

Although the carrying and loading/unloading apparatus of the present invention has been described for a truck bed in the above, other usage is also possible. Namely, when the partition plate 18 is provided on a slide plate 15 to be reciprocally moved on a bottom plate 14 and the partition plate 18 has side ends adapted to be fixed such that only the slide plate 15 is moved upon fixing the partition plate 18 and the partition plate 18 is moved together with the slide plate 15 upon disengagement of the partition plate 18, the apparatus of the present invention can be utilized as a general carrying and loading/unloading apparatus such as instead of a loading apparatus, belt conveyor or crane adapted to continuously transfer or move a load from platform such as onto a truck bed.

Figure 19A:
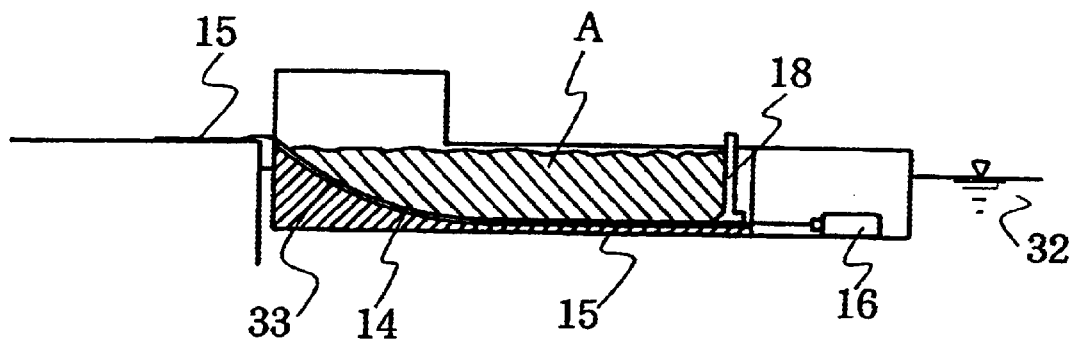
FIGS 19A–19C are side views of a carrying and loading/unloading apparatus according to another example of the first embodiment of the present invention.
Figure 19B:
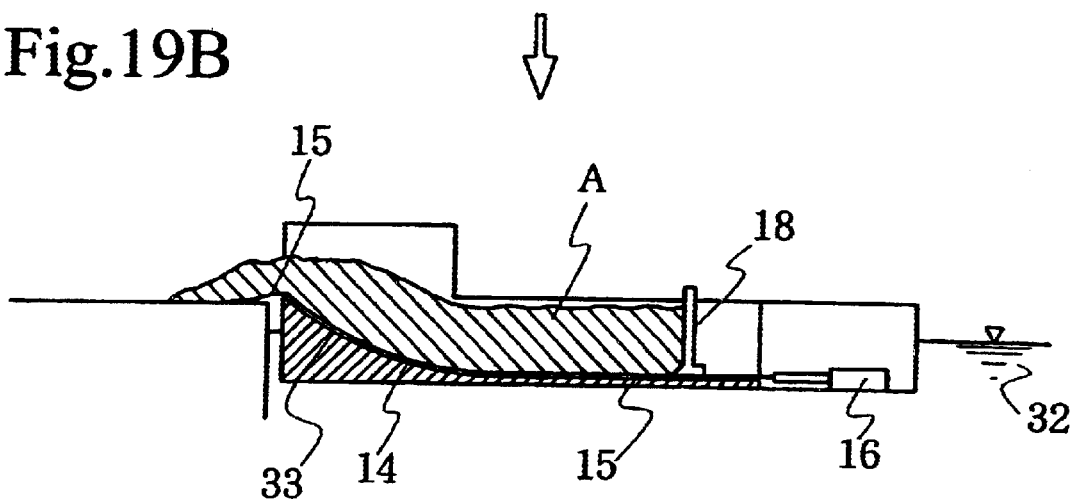
Figure 19C:
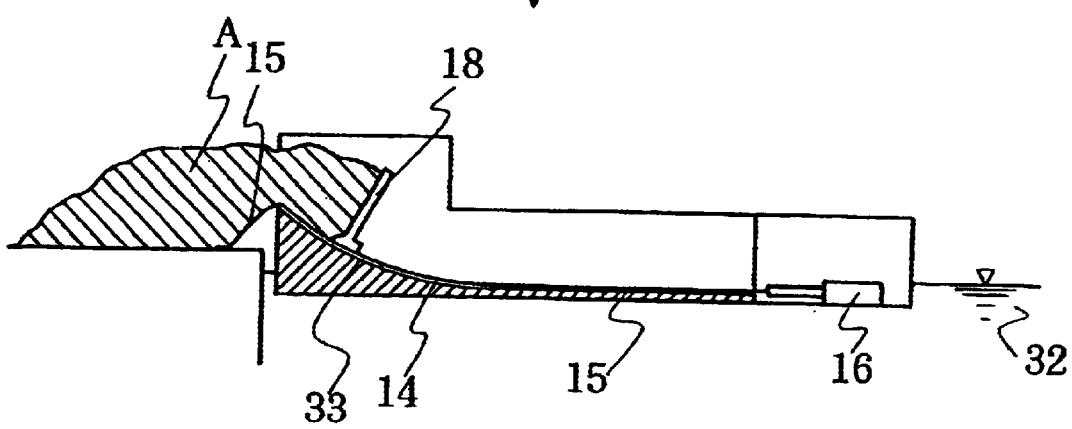

FIGS. 19A, 19B and 19C show an application example as an unloading apparatus, where the apparatus of the present invention is incorporated such as into a ship or barge to be floated on the sea 32.

The bottom plate 14 has an end portion formed as an inclination 33, and the slide plate 15 is also tilted along this inclination 33. The load A is pushed out backwardly in a stepwise manner starting from the rear end of the load A, by repeatingly engaging and disengaging the side ends of the partition plate 18 with and from side plates such as of the ship or barge, and by engaging the plate 18 only during the retracted forward movement of the slide plate 15, so as to move the plate 18 backwardly. The load A to be pushed out is elevated by the inclination 33 and then landed.

Figure 20A:
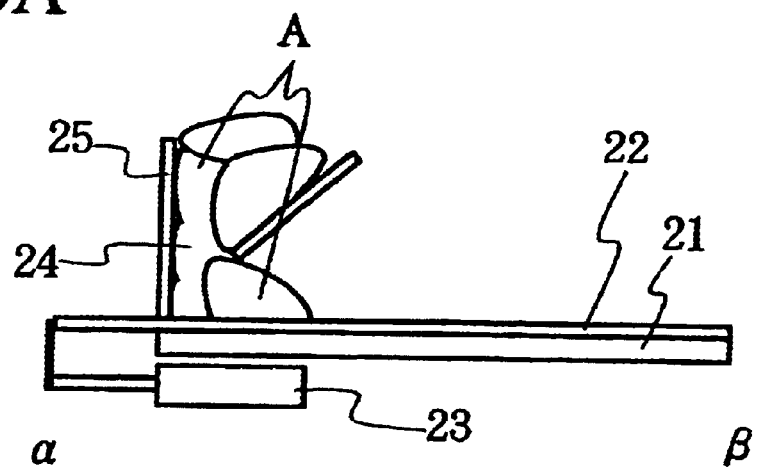
FIGS 20A–20C are explanatory side views of 1st through 3rd steps of a carrying and loading/unloading apparatus according to a second embodiment of the present invention.
Figure 20B:
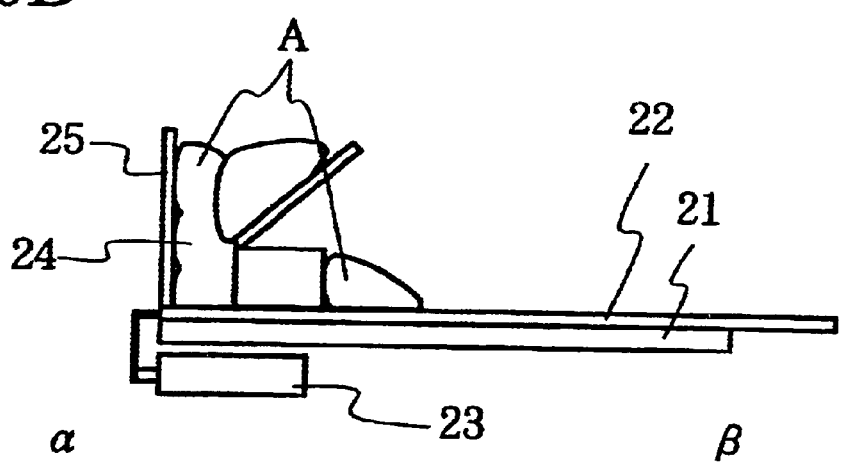
Figure 20C:
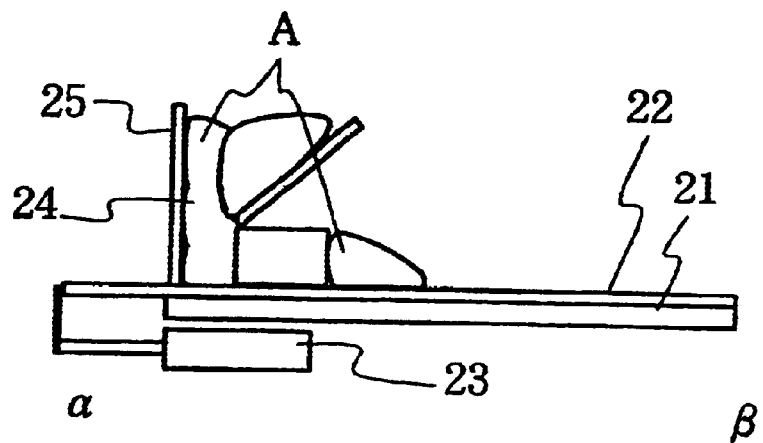

FIGS. 20A, 20B, and 20C are an explanatory side view of 1st through 3rd steps of a carrying and loading/unloading apparatus according to a second embodiment of the present invention, in which reference number 21 designates a bottom plate. This bottom plate 21 acts as that of a bed, when the apparatus of the present invention is installed on a truck bed as in the aforementioned first embodiment.

The bottom plate 21 is installed thereon with a slide plate 22 so as to reciprocally move on the plate 21. This slide plate 22 is fabricated.such as of a steel plate or a stainless plate, and has a width equal to or greater than that of the bottom plate 21 and a length longer than the plate 21. The slide plate 22 can be reciprocally moved by a driving mechanism such as a motor, and it is preferable to adopt a hydraulic or pneumatic cylinder 23.

The bottom plate 21 has one end formed with a delivering portion 24 for the load A onto the slide plate 22. The load A includes particle bodies such as scrap iron and other chips and gravel which can be continuously delivered into the delivering portion 24.

There is further provided a partition 25 as a part of a member constituting the delivering portion 24, i.e., as load movement restricting means for restricting the reciprocal movements of the load A located on the slide plate 22 and moved together with the slide plate 22, to one direction of the reciprocal movements such as a return path direction α.

The partition 25 is fabricated such as of a steel plate, and fixedly self-supports above the slide plate 22. Namely, the slide plate 22 reciprocates in a condition penetrating under the partition 25, such that the movement of the load A is restricted in the return path direction α but allowed in an advance path direction β by the partition 25.

There will be now described a procedure for using the apparatus. As shown in the uppermost depiction of FIG. 20, upon delivery of the loads A into the delivering portion 24, the lowermost one of the loads A is positioned on the slide plate 22 at this delivering portion 24.

Movement of the slide plate 22 in the advance path direction β as shown in the middle depiction of FIG. 20 under the above condition causes movement of the load A contacting with the slide plate 22 in the advance path direction β, so that the loads A at the delivering portion 24 are correspondingly reduced.

Another movement or withdrawal of the slide plate 22 in the return path direction α results in restriction of the loads A such as into the return path direction α by the partition 25, so that only the slide plate 22 moves backwardly while leaving the loads A.

Figure 21A:
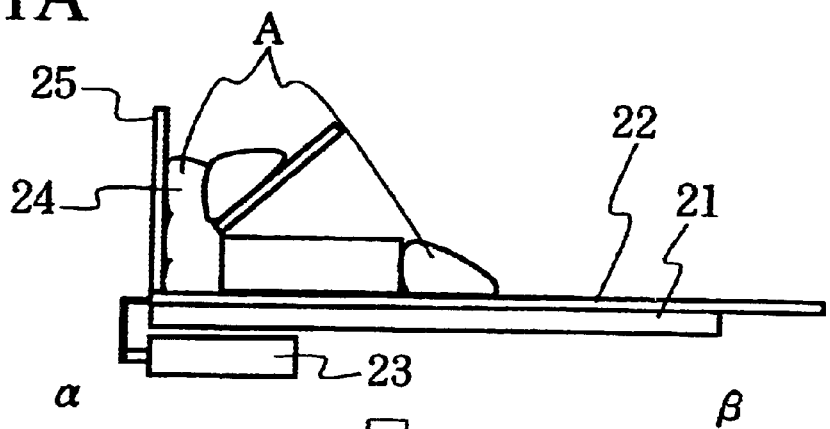
FIGS 21A–21C are explanatory side views of 4th through 6th steps of the carrying and loading/unloading apparatus according to the second embodiment of the prsent invention.
Figure 21B:
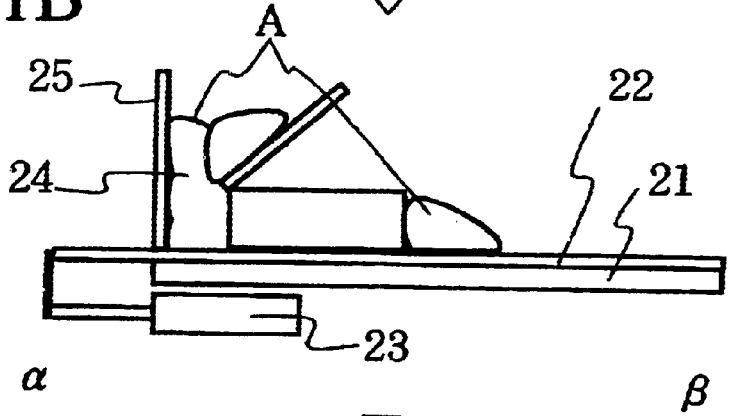
Figure 21C:
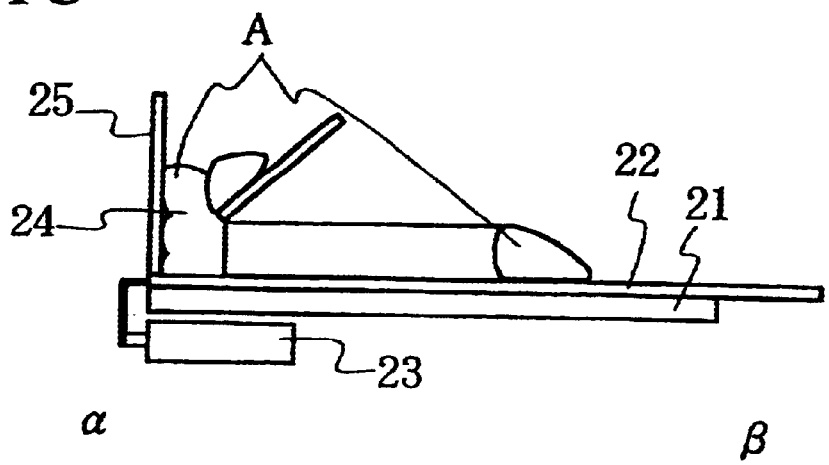
Figure 22A:
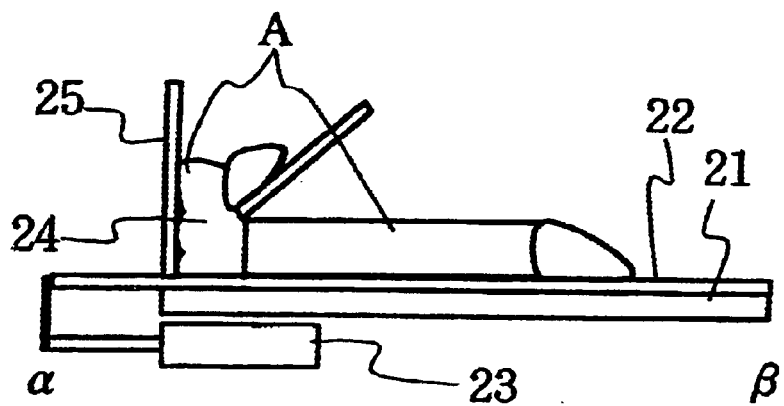
FIGS 22A–22C are explanatory side views of 7th through 9th step of the carrying and loading/unloading apparatus according to the second embodiment of the present invention.
Figure 22B:
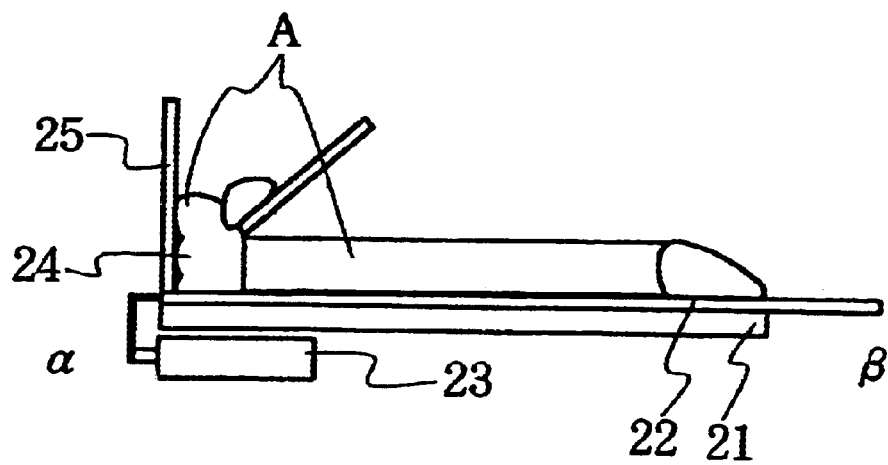
Figure 22C:
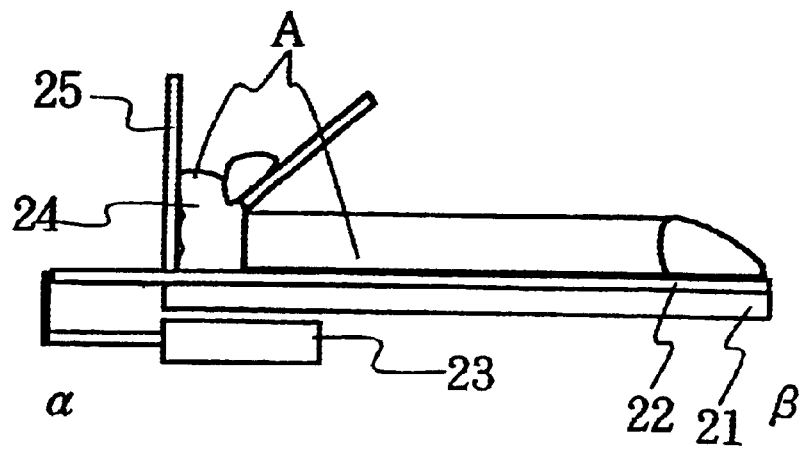
Figure 23A:
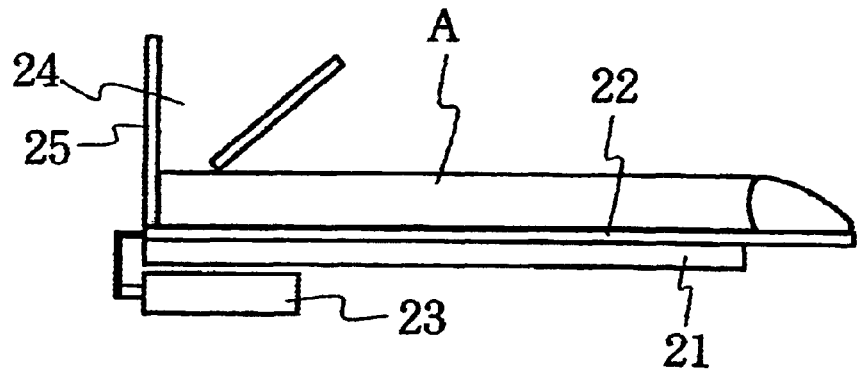
FIGS 23A–23C are explanatory side views of 10th through 12th step of the carrying and loading/unloading apparatus according to the second embodiment of the present invention.
Figure 23B:
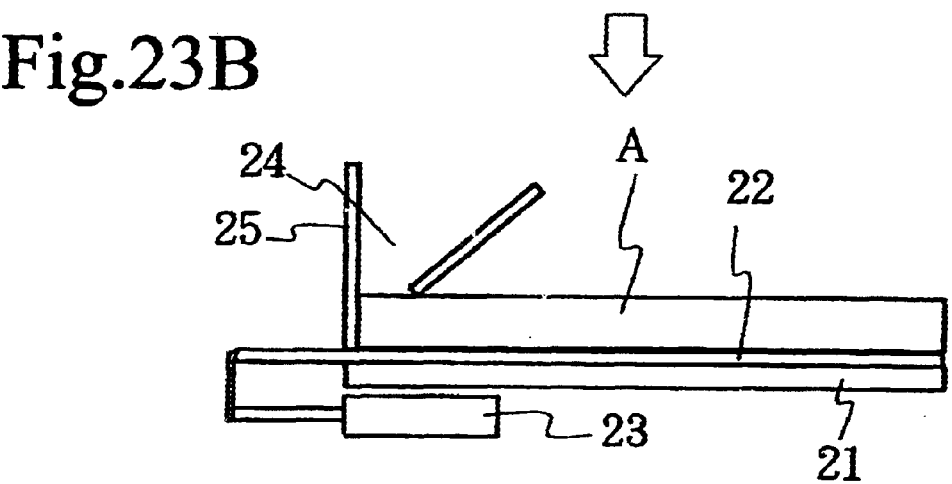
Figure 23C:
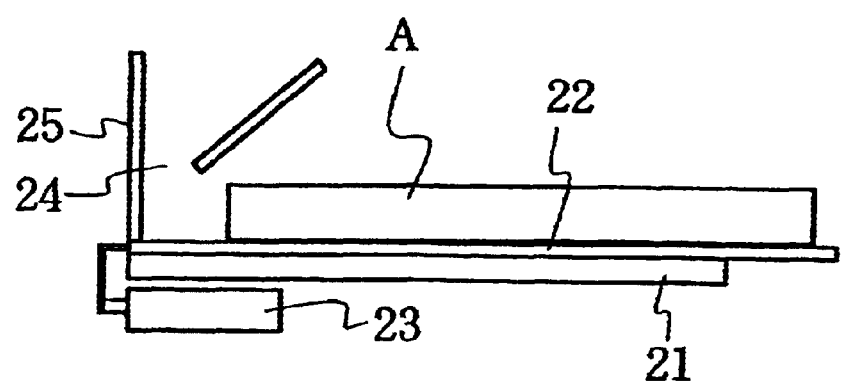

FIGS. 21A, 21B and 21C show a 2nd step. As shown at the uppermost depiction of FIG. 21, another movement of the slide plate 22 in the advance path direction β causes movement of the load A contacting with the slide plate 22, so that the loads A on the delivering portion 24 are correspondingly reduced more.

A further withdrawal of the slide plate 22 in the return path direction α results in restriction of the loads A such as into the return path direction α by the partition 25, so that only the slide plate 22 moves backwardly while leaving the loads A.

A further movement of the slide plate 22 in the advance path direction β causes movement of the load A contacting with the slide plate 22, so that the loads A on the delivering portion 24 are correspondingly reduced more.

In this way, by repeating the similar reciprocal movements of the slide plate 22 as shown in FIGS. 22A, 22B, 22C, 23A, 23B, and 23C, the loads A are sequentially fed out by transferring the loads A only in the advance path direction β while restricting the movement of the loads A in the return path direction α by means of the partition 25.

Note, although the loads A moved to the end of the slide plate 22 will drop, conveyance over a desired distance is permitted by combining a plurality of such apparatus like a belt conveyor.

Figure 24:
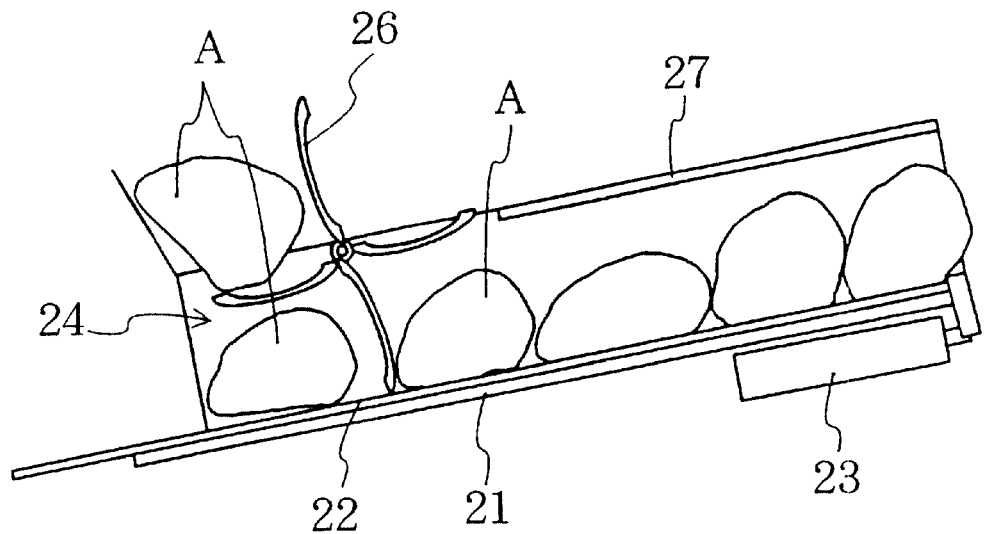
FIG. 24 is an explanatory side view of a 1st step of an application example of the carrying and loading/unloading apparatus of the present invention based on the second embodiment.
Figure 25:
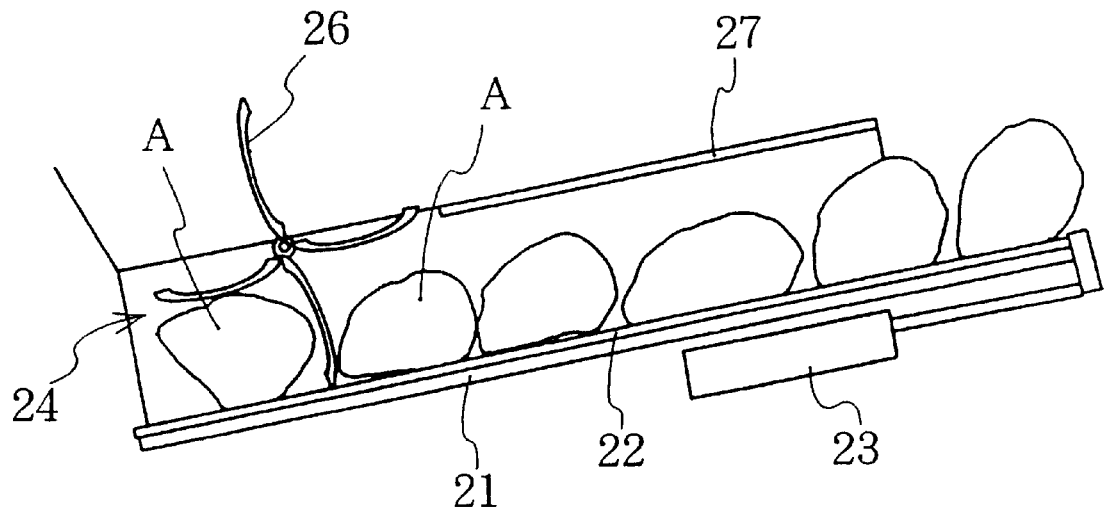
FIG. 25 is an explanatory side view of a 2nd step of an application example of the carrying and loading/unloading apparatus of the present invention based on the second embodiment.
Figure 26:
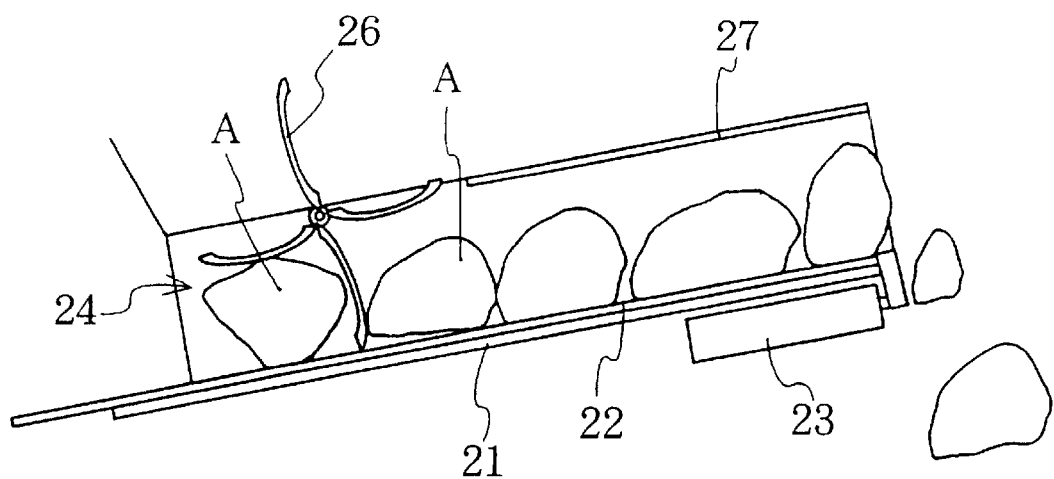
FIG. 26 is an explanatory side view of a 3rd step of an application example of the carrying and loading/unloading apparatus of the present invention based on the second embodiment.

FIGS. 24 through 26 show an application example of the aforementioned second embodiment, which enables conveyance in case of ascending inclination. Presence of inclination may move back the fed out loads A, resulting in difficulty of delivery of an additional load A. As such, the delivering portion 24 is provided with a constant amount delivery device 26 based on a one-way rotatable vane-wheel, to thereby ensure a delivery space of a new load A. Further, inclination greater than 30° requires coverage above the slide plate 22 by a lid 27.

The constant amount delivery device 26 is permitted to rotate in only one direction as described above; and the vanes of the vane-wheel correspond to the aforementioned partition 25 at the time of stoppage where no loads A are fed.

Figure 27:
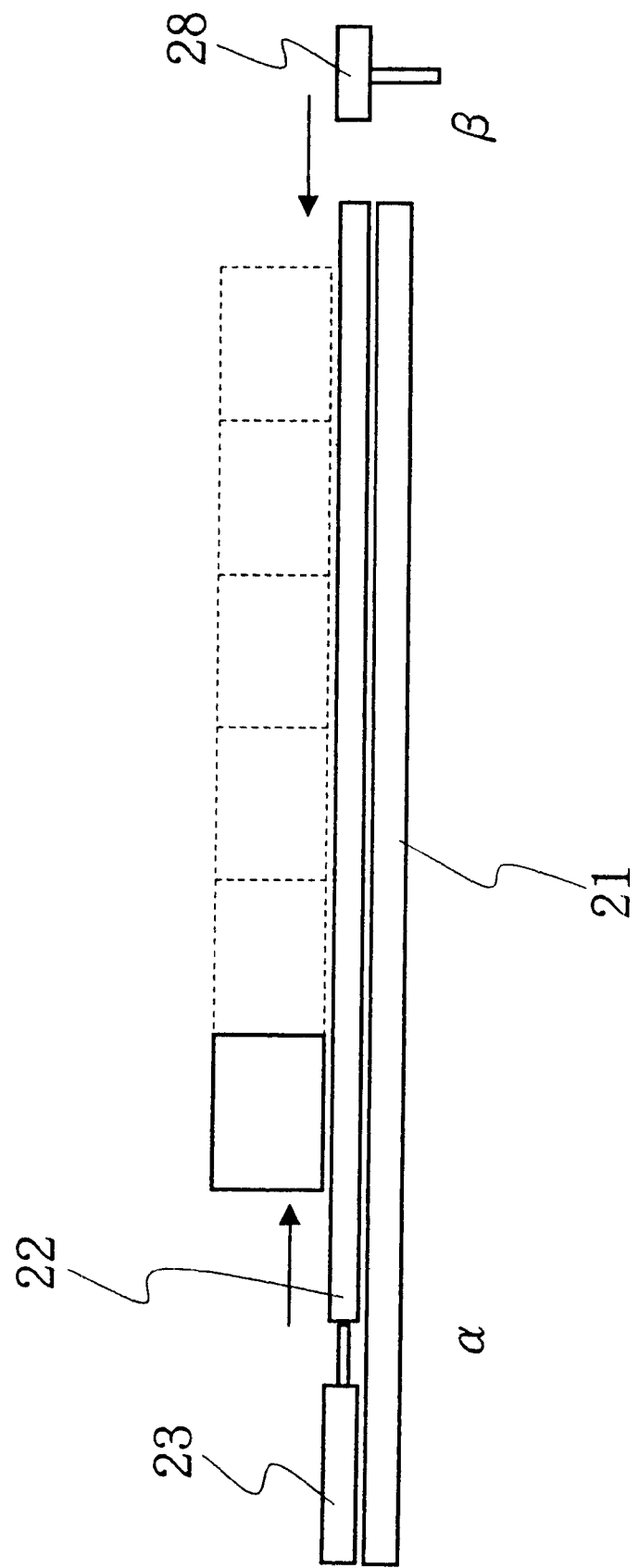
FIG. 27 is an explanatory side view showing a carrying and loading/unloading apparatus according to a third embodiment of the present invention.

FIG. 27 shows a third embodiment of the present invention, where the slide plate 22 is installed on the bottom plate 21 so as to reciprocally move thereon similarly to the aforementioned second embodiment. In this embodiment, the movement of the slide plate 22 in one direction of the reciprocal movements such as in the return path direction α is rendered to be fast or rapid relative to in the advance path direction β, such that the load A to be positioned on the slide plate 22 and apt to be moved together with the slide plate 22 is kept at its then position under the inertia of the load A when the slide plate 22 is moved in the return path direction α so rapidly.

Methods for moving the slide plate 22 in such a way can be variously thought of, and include one where a cylinder 23 is provided similarly to the aforementioned second embodiment such that the extension and retraction speeds of the cylinder 23 are different from each other. It is possible that the cylinder 23 is used only upon movement of the slide plate 22 in the advance path direction β, and a striking device 28 such as a hammer is used for the movement in the return path direction α. The striking device may provide successive strikes by moving itself in the return path direction, or only one strong strike without moving so. In this case, the cylinder 23 used for moving the slide plate 22 in the advance path direction α is made free.

Although the loads A to be positioned on the slide plate 22 tend to reciprocally move together with the slide plate 22, the loads A always moves only in the advance path direction β if the movement of the slide plate 22 in the return path direction α is performed while the loads A still have a speed in the advance path direction β. The difference between speeds of the slide plate 22 in the return path direction α and advance path direction β causes the loads A to sequentially move in the advance path direction β.

The speed for moving the slide plate 22 in the return path direction α without moving the loads A is to be determined by considering a frictional resistance between the slide plate 22 and the loads A as well as the inclination of the slide plate 22. Further, the slide plate 22 rapidly moved into the return path direction α by the striking device 28 may be suddenly decelerated or stopped such as by a brake.

FIG. 28 shows a fourth embodiment of the present invention. This embodiment is similar to the aforementioned second and third embodiments in that the slide plate 22 is reciprocally moveably installed on the bottom plate 21. In this embodiment, however, successive strikes are given by the striking device 28 to the slide plate 22 from the advance path direction β toward the return path direction α, to thereby move the loads A in the advance path direction.

The striking device 28 is, for instance, a hammer; and so as to provide successive strikes, a restoring device 31 such as a spring is provided on the slide plate 22.

Application of a strike to the slide plate 22 from the advance path direction β toward the return path direction α renders the loads A stay by inertia that is about to rest, and then the loads A are further moved by a restoring device 31 in the advance path direction B together with the slide plate 22.

The restoring device 31 immediately pushes back the slide plate 22 toward the original position of the plate 22 upon strike of the striking device 28 on the plate 22 in the return path direction α, and pushes back the slide plate 22 at a speed slightly slower than a speed at which the striking device 28 moves the slide plate 22.

FIGS. 29A, 29B, 29C, 30A, 30B, 30C, 31A, 31B, and 31C show a fifth embodiment of the present invention. This embodiment is similar to the aforementioned second embodiment in that the slide plate 22 is reciprocally moveably installed on the bottom plate 21. In this embodiment, however, two pieces of moveable partition 29 and fixed partition 30 are provided above the slide plate 22. The moveable partition 29 moves synchronously with the slide plate 22 such as in the advance path direction β, whereas only the slide plate 22 moves in one of the reciprocal movements of the slide plate 22 such as in the return path direction α. The fixed partition 30 is fixed fully irrespectively of the reciprocal movements of the slide plate. The moveable partition 29 and fixed partition 30 are initially separated from each other by a distance, and the delivery of the loads A shall be done at the moveable partition 29 side separated from the fixed partition 30.

Further, as a mechanism for moving the moveable partition 29 synchronously with the slide plate 22 when the reciprocal movements of the slide plate 22 are conducted by the cylinder 23, there can be thought of means or methods for moving the moveable partition 29 in the advance path direction β at a speed identical with that of an extension speed of the cylinder 23, such as: a method for pushing out the moveable partition 29 by providing another cylinder; a method for suitably pulling the moveable partition 29 by a rotating endless chain via means for engaging and disengaging the chain with and from the moveable partition 29; and a method for using an antenna-like telescopic multi-stage cylinder. Such a telescopic multi-stage cylinder has a length to be held by stopping an oil flow to the cylinder, thereby enabling stoppage of the moveable partition 29.

Note, without positively driving such a telescopic cylinder by means of a pump, it is also effective to use such a cylinder by directly connecting the same with an oil tank so that the cylinder is extended and retracted by the partition. In such a situation, the length of the cylinder can be held by duly blocking the oil into and from the cylinder.

Figure 29A:
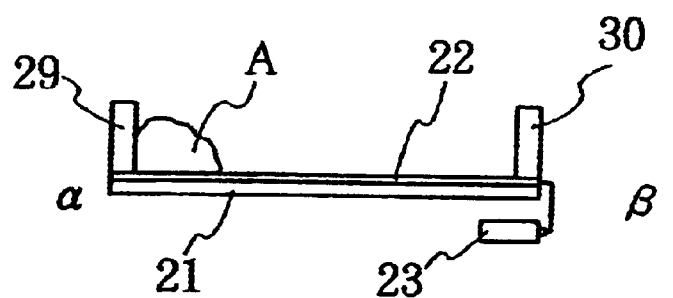
FIGS. 29A–29E are explanatory side views showing 1st through 5th steps of a carrying and loading/unloading apparatus according to the fifth embodiment of the present invention.
Figure 29B:
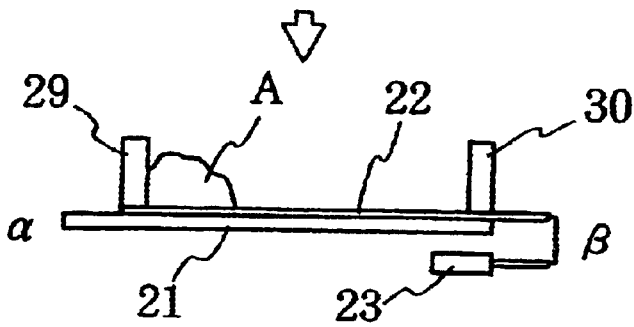
Figure 29C:
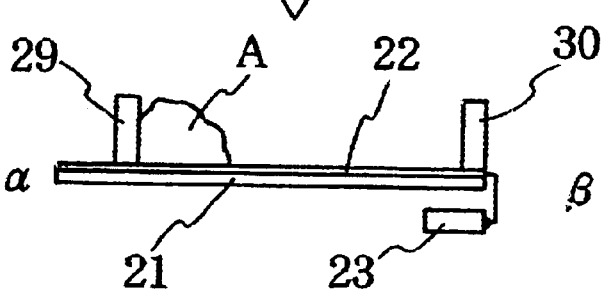
Figure 29D:
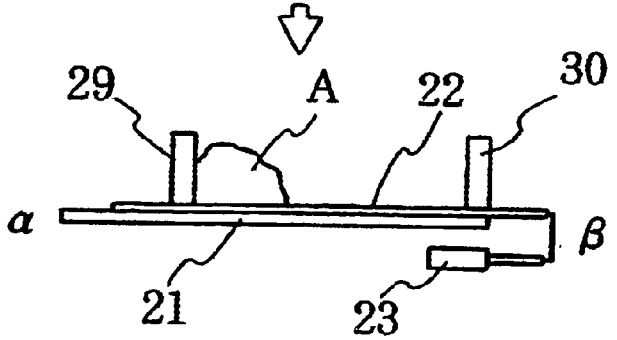
Figure 29E:
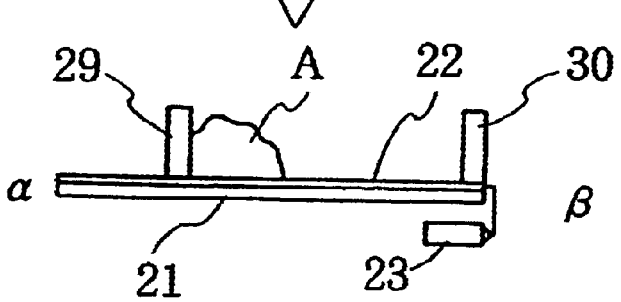

As shown in the uppermost depictin of FIG. 29A, the loads A are firstly positioned on the slide plate 22 so as to contact with the moveable partition 29, and the slide plate 22 and moveable partition 29 are then moved in the advance path direction β so that the loads A are moved correspondingly in the advance path direction β. Next, only the slide plate 22 is moved in the return path direction α while leaving the moveable partition 29, and then the slide plate 22 and the moveable partition 29 are again moved in the advance path direction β so that the loads A are correspondingly moved further in the advance path direction β. From this state, only the slide plate 22 is moved in the return path direction α while leaving the moveable partition 29.

In delivering new loads A between the already moved loads A and the moveable partition 29 after separating them from each other, it is necessary to firstly move only the moveable partition 29 in the return path direction α while leaving the already moved loads A. This can be achieved such as by: a method for fixing only the moveable partition 29 and moving only the slide plate 22 in the advance path direction β, to thereby separate the loads A from the moveable partition 29; and provision of a mechanism capable of positively moving the moveable partition 29 in the return path direction α.

As shown in FIGS. 30A, 30B, and 30C, the loads A and the moveable partition 29 are separated from each other, and new loads A are provided therebetween.

Figure 31A:
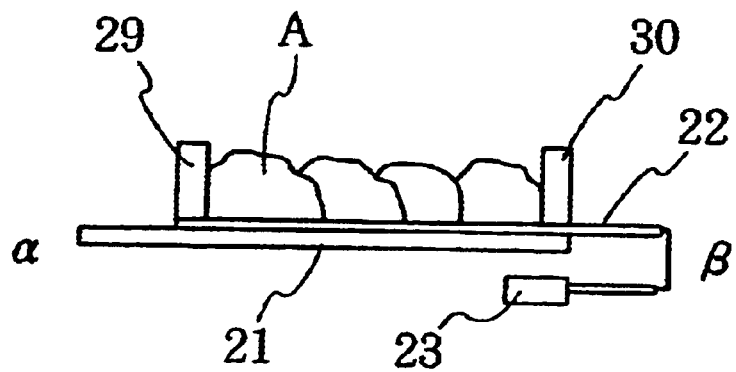
FIGS. 31A–31C are explanatory side views of 8th through 10th steps of th fifth embodiment of the present invention.
Figure 31B:
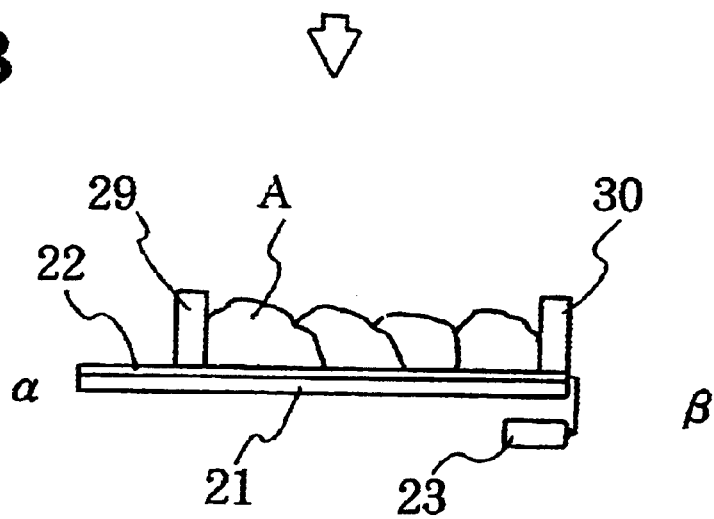
Figure 31C:
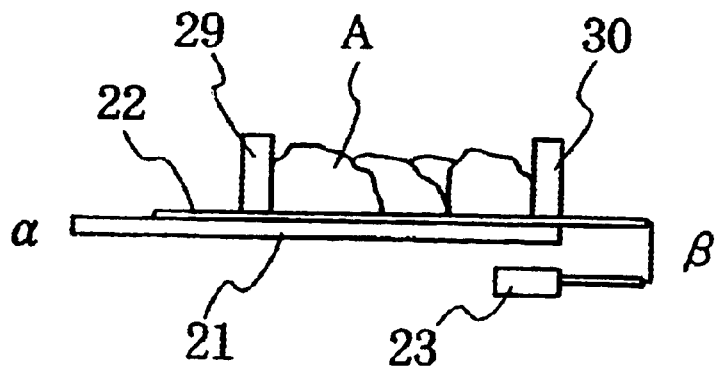
Figure 32:
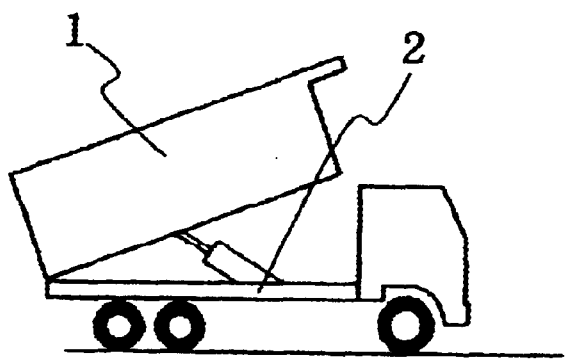
FIG. 32 is a side view showing a conventional first example.
Figure 33:
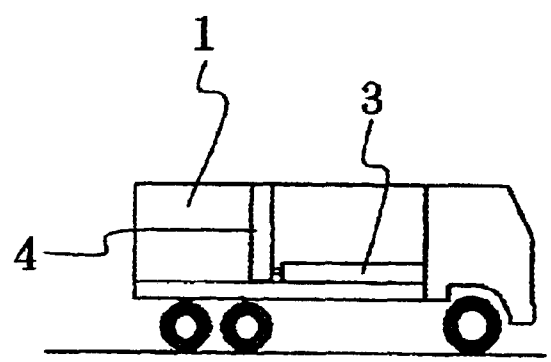
FIG. 33 is a side view showing a conventional second example.
Figure 34:
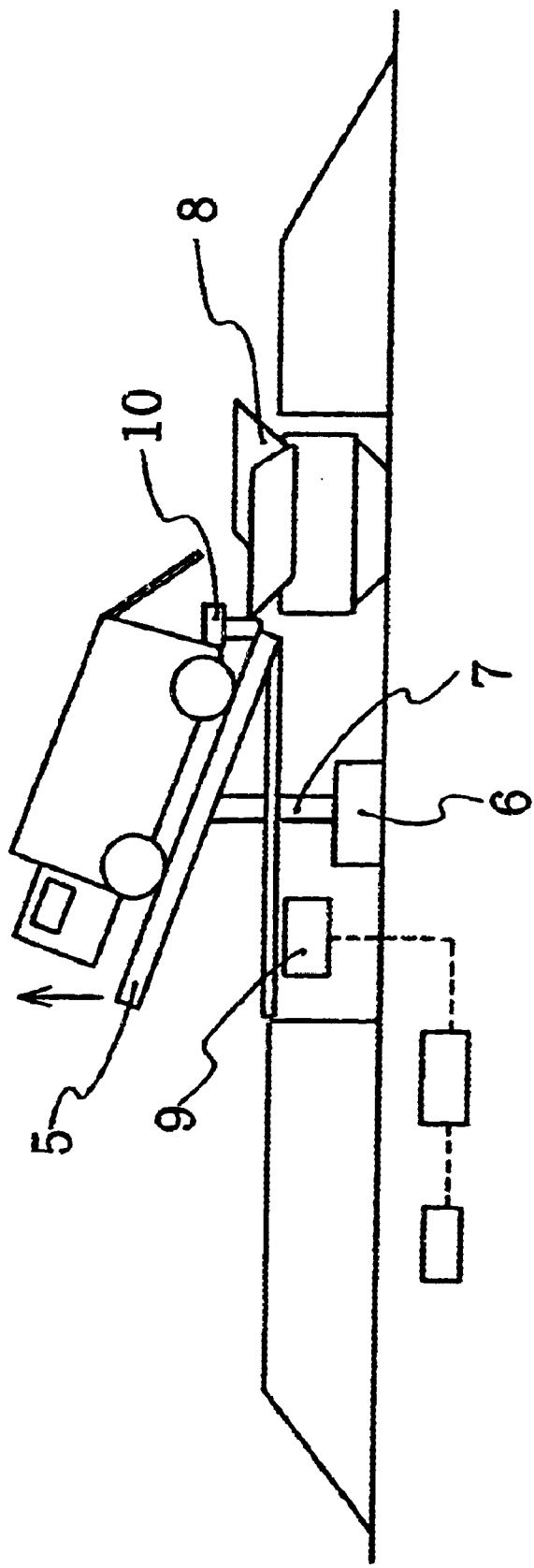
FIG. 34 is a side view showing a conventional third example.

Upon accumulation of the loads A in this way to a certain extent as shown in FIGS. 31A, 31B and 31C, the moveable partition 29 is moved in the advance path direction β relative to the slide plate 22 making use of the fact that the moveable partition 29 moves synchronously with the slide plate 22 such as in the advance path direction β whereas only the slide plate 22 moves in one of the reciprocal movements of the slide plate 22 such as in the return path direction α; so that the distance between the moveable partition 29 and the fixed partition 30 is shortened to thereby press the loads A between the moveable partition 29 and the fixed partition 30.

As described above, the carrying and loading/unloading apparatus of the present invention: can be utilized as a loading apparatus or an unloading apparatus such as for a truck bed; is capable of effectively transferring loads by utilizing reciprocal movements of the slide plate as means adapted to continuously move loads such as instead of a belt conveyor and a crane; is simple in itself and inexpensive; and allows an effective loading/unloading task with a fewer workers in a sufficiently safe manner.

What is claimed is:

1. A carrying and loading/unloading apparatus comprising:
   a bottom plate;
   a slide plate provided on said bottom plate so as to reciprocally move rearward and forward on said bottom plate;
   a means for reciprocally moving the slide plate;
   a partition plate provided on and frictionally engageable with said slide plate, said partition plate having securable side ends, so that only said slide plate below said partition plate is moved when said side ends of said partition plate are secured as said sliding plate reciprocally moves forward and so that said partition plate moves together with said slide plate by friction when said side ends of said partition plate are released as said sliding plate reciprocally moves rearward; and wherein:
   the partition plate is made of a metal plate and is provided with a bottom base so that said partition plate is self-supported on the slide plate.

2. A carrying and loading/unloading apparatus constituting an unloading apparatus for a truck bed, comprising:
   a slide plate provide on a bottom plate of the truck bed so as to reciprocally move on said bottom plate from a cabin side of a truck bed toward the rear end of the truck bed;
   a means for reciprocally moving the slide plate; and
   a partition plate provided on and frictionally engageable with said slide plate, said partition plate having side ends securable to right and left side plates of the truck bed, so that only said slide plate below said partition plate is moved when said side ends of said partition plate are secured as said sliding plate moves toward a cabin end of the truck bed and so that said partition plate moves together with said slide plate by means of friction when said side ends of said partition plate are released as said sliding plate moves toward a rear end of the truck bed; and wherein:
   the partition plate is made of a metal plate and is provided with a bottom base so that said partition plate is self-supported on the slide plate.

* * * * *